Patented Aug. 6, 1929.

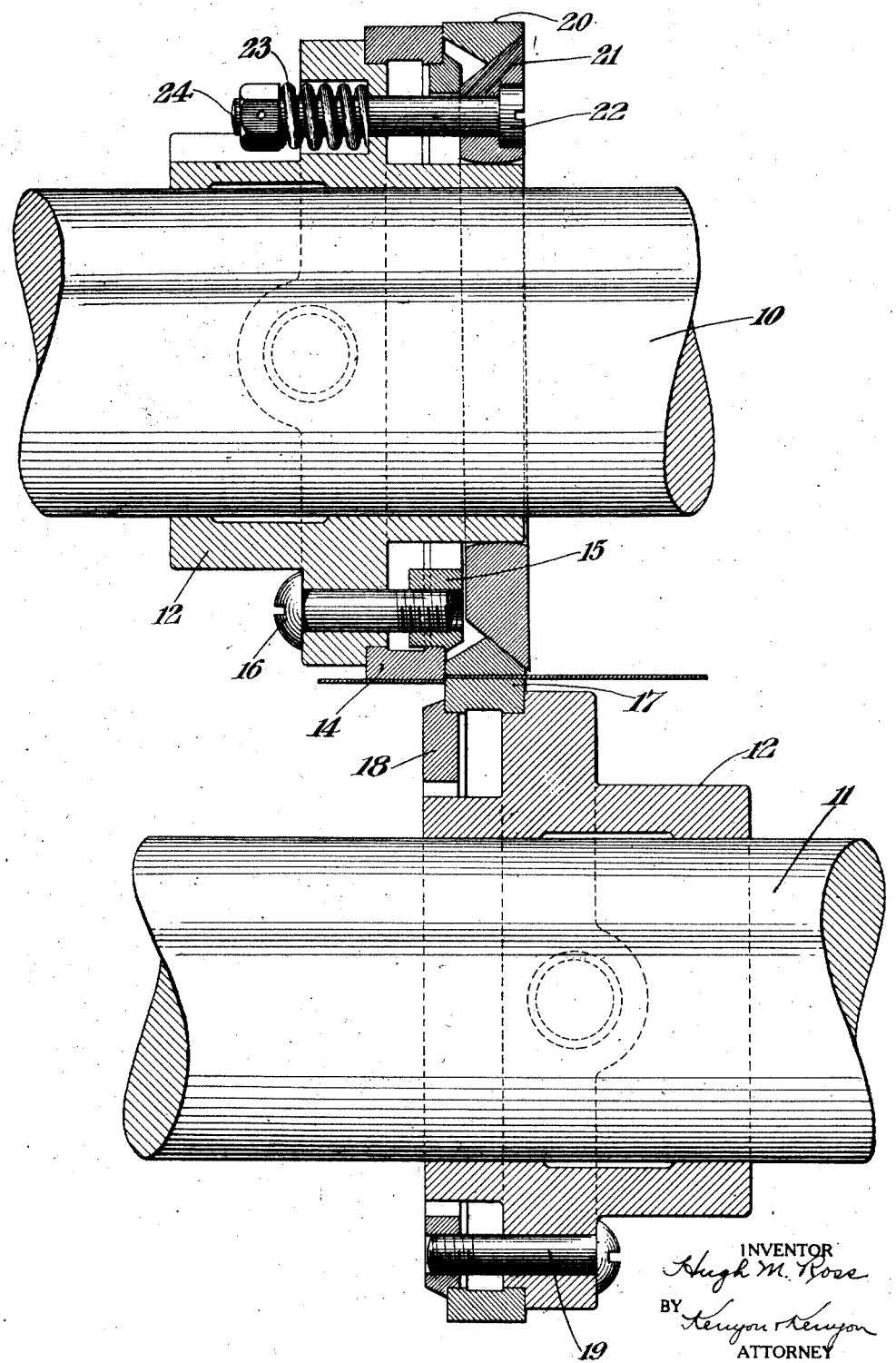

1,723,660

UNITED STATES PATENT OFFICE.

HUGH M. ROSS, OF NEW YORK, N. Y., ASSIGNOR TO ADRIANCE MACHINE WORKS, INC., OF BROOKLYN, NEW YORK, A CORPORATION OF NEW YORK.

CUTTING MECHANISM.

Application filed April 20, 1928. Serial No. 271,494.

This invention relates to cutting mechanisms and has for an object a self-feeding rotary cutting device.

According to this invention, a pair of rotary cutters are supported by shafts off-set from each other and have a slight overlapping contact of their faces. The co-acting peripheral edges of the cutters are effective to shear a sheet of metal fed between them when the cutters are oppositely rotated. A friction ring is rotatable with one of the cutters and is arranged to have its peripheral surface contact with the peripheral surface of the other cutter. The friction ring is capable of slight movement in a direction at right angles to its axis of rotation, to permit the insertion of a sheet of metal between its peripheral surface and that of the coacting cutter. Thus, rotation of the cutters is effective by the gripping action of the friction ring and one of the cutters to feed a metal strip between the cutters to effect shearing thereof. One piece of the sheared metal strip is held between the friction ring and the co-operating cutter while the other strip is free.

Other objects, novel features and advantages of this invention will be apparent from the following specification and accompanying drawing, wherein the single figure is a vertical section through a cutting mechanism embodying the invention.

The reference numerals 10 and 11 designate shafts which are driven by mechanism not shown in opposite directions at the same speed. A hub 12 is fixed to the shaft 11 and similarly a hub 13 is fixed to the shaft 10. An annular cutter 14 fits in a groove formed in the hub 12 and is attached to the hub by means of a clamping ring 15 which is held in clamping relation to the ring by a plurality of bolts 16, only one bolt being shown in the drawing.

A corresponding annular cutter 17 is clamped to the hub 13 by means of a clamping ring 18 which is held in place by bolts 19, one only of which is shown in the drawing. The cutters 14 and 17 have an overlapping contact of their faces sufficient to shear a sheet of metal or the like fed between them on rotation of the cutters.

A friction ring 20 is carried by the hub 12 in alinement with the cutter 17. The inner face of the ring 20 is tapered as shown to provide a frusto-conical surface 20$^a$. A clamping ring 21 for the friction ring 20 has a frusto-conical outer surface of the same taper as that of the surface 20$^a$ of the friction ring, the two surfaces normally being in contact. The ring 21 is held in contact with the ring 15 by bolts 22, only one of which is shown, said bolt having springs 23 arranged in sockets in the hub 12 and having their ends contacting with nuts 24 threaded on the bolts 22. The inner surface of the ring 21 is convex for a purpose later to be set forth.

When the cutting mechanism is running idle, the peripheral surface of the friction ring 20 contacts with the peripheral surface of the cutter 17 and the ring 20 is co-axial with the cutter 14. However, when the strip of metal is fed between the cutters, the ring 20 moves in a direction at right angles to the axis of its cutter. Such movement of the ring 20 effects relative movement of the frusto-conical surfaces and causes a slight pivoting of the ring 21 as shown in the drawing, this pivoting action being permitted by the springs 23. The pull exerted by the springs 23 tends to force the ring 20 toward the cutter 17 to grip between them the metal strip and feed the latter between the cutters.

The cutting mechanism above described is self-feeding and obviates the need of additional feeding mechanism. Whenever a strip of metal is presented to the cutters, it is gripped between the friction ring 20 and the cutters 17 and by them is fed along as the cutting operation proceeds. The gripping force is supplied to the ring 20 by the spring 23 through the clamping ring 21. The latter is tilted slightly upon movement of the ring 20 in a direction at right angles to the axis of the shaft 10 and tends to oppose such movement under the influence of the springs 23. The fulcrum point for this tilting movement is opposite the contacting point of the ring with the metal strip and is designated 21$^a$. The convex inner surface of the ring 21 slides on the hub without disturbing the relation of the parts. Its tilting is sufficient to permit the interposition of a strip of metal between the cutter 17 and the ring 20, and its tendency to return to normal position under the influence of the springs 23 forces the ring 20 into gripping contact with the strip of metal.

It is understood, of course, that this invention is not limited to the specific structure above disclosed, but that various modifications can be made without in any way departing from the spirit of the invention as defined in the appended claims.

I claim:

1. A device of the character described, comprising a pair of rotary cutters having overlapping faces, a friction ring having its peripheral surface in contacting relationship to the peripheral surface of one of said cutters, means supporting said ring from the other of said cutters for rotary movement and movement at right angles to its axis of rotation, and means for pressing said ring toward said first cutter.

2. A device of the character described, comprising a pair of rotary cutters having overlapping faces, a friction ring having its peripheral surface in contacting relationship to the peripheral surface of one of said cutters and resilient means supporting said ring from the other of said cutters for rotation and movement at right angles to its axis of rotation, said resilient means being effective to press said ring toward said first cutter.

3. A device of the character described, comprising a pair of rotary cutters having overlapping faces, a friction ring rotatable with one cutter and having its peripheral surface in contacting relationship to the peripheral surface of the other cutter and means for supporting said ring for movement at right angles to its axis of rotation, said means being effective to press said ring toward said second cutter.

4. A device of the character described, comprising a pair of rotary cutters having overlapping faces, a friction ring having its peripheral surface in contacting relationship to the peripheral surface of one of said cutters, a clamping ring, said clamping and friction ring having coacting frusto-conical surfaces, and resilient means connecting said clamping ring to said other cutter.

5. A device of the character described, comprising a pair of rotary cutters having overlapping faces, a friction ring having its peripheral surface in contacting relationship to the peripheral surface of one of said cutters, an annular member having its inner surface convex and its outer surface frusto-conical, said friction ring having a frusto-conical surface co-operating with that of the clamping member, and means resiliently connecting said clamping member to the other of said cutters.

6. A device of the character described, comprising a pair of rotary cutters having overlapping faces, a friction ring having its peripheral surface in contacting relationship to the peripheral surface of one of said cutters, an annular member having its inner surface convex and its outer surface frusto-conical, said friction ring having a frusto-conical surface co-operating with that of the clamping member, bolts connecting said clamping member and said other cutter, and springs exerting pressure on said bolts to hold said clamping ring in position.

7. A device of the character described, comprising a pair of rotary cutters having overlapping faces, a friction ring having its peripheral surface in contacting relationship to the peripheral surface of one of said cutters, an annular clamping member having a convex inner surface and a frusto-conical outer surface, said friction ring having a frusto-conical surface coacting with that of said clamping member, bolts connecting said clamping member and the other of said cutters, and springs exerting pressure on said bolts in one direction.

8. A device of the character described, comprising a pair of rotary cutters having overlapping faces, a friction ring having its peripheral surface in contacting relationship to the peripheral surface of one cutter, and means normally supporting said ring coaxial with said other cutter and effecting rotation thereof, said means being yieldable to permit movement of said ring in a direction at right angles to the axis of rotation.

9. A device of the character described, comprising a pair of rotary cutters having overlapping faces, a friction ring having its peripheral surface in contacting relationship to the peripheral surface of one of said cutters, a clamping ring, said clamping and friction ring having co-acting frusto-conical surfaces, and resilient means connecting said clamping ring to said other cutter and permitting pivotal movement of said clamping ring about a fulcrum beyond the axis of the last-named cutter.

In testimony whereof, I have signed my name to this specification.

HUGH M. ROSS.